(12) United States Patent
Lee

(10) Patent No.: US 10,086,294 B2
(45) Date of Patent: Oct. 2, 2018

(54) GAME SERVICE METHOD AND SYSTEM

(71) Applicants:NHN Entertainment Corporation, Seongnam-si (KR); NHN Studio629 Corporation, Seongnam-si (KR)

(72) Inventor: Keeyun Lee, Seongnam-si (KR)

(73) Assignees: NHN Entertainment Corporation, Seongnam-si (KR); NHN Studio629 Corporation, Seongnam-si (KR)

( * ) Notice: Subject to any disclaimer, the term of this patent is extended or adjusted under 35 U.S.C. 154(b) by 574 days.

(21) Appl. No.: 14/714,955

(22) Filed: May 18, 2015

(65) Prior Publication Data

US 2015/0328543 A1    Nov. 19, 2015

(30) Foreign Application Priority Data

May 19, 2014  (KR) .......................... 10-2014-0059709

(51) Int. Cl.
| | | |
|---|---|---|
| *A63F 13/798* | (2014.01) | |
| *A63F 13/795* | (2014.01) | |
| *A63F 13/67* | (2014.01) | |
| *A63F 13/497* | (2014.01) | |
| *A63F 13/30* | (2014.01) | |
| *A63F 13/332* | (2014.01) | |
| *A63F 13/335* | (2014.01) | |

(52) U.S. Cl.
CPC ............ *A63F 13/798* (2014.09); *A63F 13/30* (2014.09); *A63F 13/497* (2014.09); *A63F 13/67* (2014.09); *A63F 13/795* (2014.09); *A63F 13/332* (2014.09); *A63F 13/335* (2014.09)

(58) Field of Classification Search
None
See application file for complete search history.

(56) References Cited

U.S. PATENT DOCUMENTS

2007/0060359 A1*  3/2007  Smith ................... G09B 19/22
                                            463/42
2007/0173332 A1   7/2007  Liu et al.
(Continued)

FOREIGN PATENT DOCUMENTS

| JP | 06-105959 | 4/1994 |
| JP | 2000-51518 | 2/2000 |

(Continued)

OTHER PUBLICATIONS

Japanese Office Action dated Oct. 15, 2016, in Japanese Patent Application No. 2015-100976.

*Primary Examiner* — Robert T Clarke, Jr.
(74) *Attorney, Agent, or Firm* — H.C. Park & Associates, PLC

(57) ABSTRACT

Provided is a game service method and system. The game service method may include providing a game service to terminals of game users over a network; setting rankings of the game users based on progress results of the game service; storing and managing a game log of a previous game played by a first game user of a predetermined ranking or greater in association with the first game user; and providing a replay service to replay the previous game played by the first game user on a terminal of a second game user based on the game log stored in association with the first game user, in response to a request from the terminal of the second game user.

18 Claims, 10 Drawing Sheets

(56) References Cited

U.S. PATENT DOCUMENTS

| | | | |
|---|---|---|---|
| 2013/0244740 A1* | 9/2013 | Shimamura | A63F 13/837 463/2 |
| 2015/0258438 A1* | 9/2015 | Tait | A63F 13/355 463/31 |

FOREIGN PATENT DOCUMENTS

| | | |
|---|---|---|
| JP | 2002-273045 | 9/2002 |
| JP | 2003290505 | 10/2003 |
| JP | 2004-24360 | 1/2004 |
| JP | 2004-201813 | 7/2004 |
| JP | 2008-541961 | 11/2008 |
| JP | 2010-239990 | 10/2010 |
| JP | 2012061024 | 3/2012 |
| JP | 2012-75885 | 4/2012 |
| JP | 5183823 | 4/2013 |
| KR | 10-2014-0019587 | 2/2014 |
| KR | 10-2014-0037893 | 3/2014 |

* cited by examiner

GAME SERVICE METHOD AND SYSTEM

CROSS-REFERENCE TO RELATED APPLICATION

This application claims priority from and the benefit of Korean Patent Application No. 10-2014-0059709, filed on May 19, 2014, which is hereby incorporated by reference for all purposes as if fully set forth herein.

BACKGROUND

Field

Exemplary embodiments relate to a game service method and system that may support a user to select a counter party to play a match with.

Discussion of the Background

Online games refer to games based on a network. In general, the online games refer to games being played on the Internet and mostly correspond to multimedia games designed to perform multiple plays through the Internet.

Mobile games may be a kind of video games that users may play through portable devices such as mobile phones, smartphones, personal digital assistants (PDAs), and portable media players. With the developments in the mobile environment, game users may enjoy online games through mobile devices.

A variety of genres are present for online games. For example, a defense game is classified as a game genre in which it is a key element to stop game characters of a counter party, for example, another game user or an artificial intelligence player.

Further, in many online games, rankings of game users are determined. For example, in the case of a game that allows a match between game users, a ranking may be determined based on the number of wins or points according to the number of wins. In the case of a game for accomplishing a game mission, a ranking may be determined based on a progress level of the game mission or points according to the progress of the game mission.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a game service method and system that may provide a replay service of a game to a second game user based on a game log of a previous game played by a first game user, with respect to the first game user of a predetermined ranking or greater based on rankings of game users.

Exemplary embodiments also provide a game service method and system that may intermediate a match between a first game user and a second game user in response to a selection of the second game user using a replay service.

Additional features of the invention will be set forth in the description which follows, and, in part, will be apparent from the description, or may be learned by practice of the inventive concept.

An exemplary embodiment discloses a game service method including providing a game service to terminals of game users over a network; setting rankings of the game users based on progress results of the game service; storing and managing a game log of a previous game played by a first game user of a predetermined ranking or greater in association with the first game user; receiving a request for a replay service from a terminal of a second game user; and providing the replay service to replay the previous game played by the first game user on the terminal of the second game user based on the game log stored in association with the first game user, in response to the request from the terminal of the second game user.

According to an exemplary embodiment, the previous game played by the first game user may include a predetermined number of games most recently played by the first game user or a predetermined number of games most recently won by the first game user. The providing of the replay service may include providing the replay service to replay a game selected at the terminal of the second game user or a game randomly selected from among the predetermined number of games.

According to an exemplary embodiment, the providing of the replay service may include transmitting the game log of the previous game played by the first game user to the terminal of the second game user. The selected game may be replayed based on the game log on the terminal of the second game user.

According to an exemplary embodiment, the providing of the replay service may include creating a replay video of the selected game based on the game log of the previous game played by the first game user, and transmitting the created replay video to the terminal of the second game user.

According to an exemplary embodiment, the game service method may further include receiving a request for a match associated with the replay service from the terminal of the second game user, and intermediating a match between the first game user and the second game user in response to the request for a match associated with the replay service from the terminal of the second game user.

According to an exemplary embodiment, the intermediating may include creating an artificial intelligence player for processing the same play as a play of the previous game played by the first game user based on the game log, and processing a match between the artificial intelligence player and the second game user.

According to an exemplary embodiment, the game service may service a defense genre of a game in which a character appears in the game based on the number of available sorties set for each character with respect to at least one character owned by a game user and the game user fights with at least one character of a counter party.

According to an exemplary embodiment, in the game, in the case of a character of which a character-by-character reuse standby time is over, the character may appear on the game in response to a sortie instruction of the game user, and in the case of a character of which an automatic sortie is activated using an automatic sortie function, the character may appear on the game in response to the character-by-character reuse standby time being over, irrespective of the sortie instruction of the game user.

An exemplary embodiment also discloses a game service method including providing a game service to terminals of game users over a network; storing and managing a game log of a game played through the game service in association with a first game user having played the game; receiving a request for a match from a second game user; creating an artificial intelligence player for processing the same play as a play of a previous game played by the first game user based on the game log in response to the request for a match from the second game user; and processing a match between the artificial intelligence player and the second game user.

An exemplary embodiments further discloses a game service system including a game service provider configured to provide a game service to terminals of game users over a network; a ranking setter configured to set rankings of the game users based on progress results of the game service; a game log manager configured to store and manage a game log of a previous game played by a first game user of a predetermined ranking or greater in association with the first game user; and a replay service provider configured to provide a replay service to replay the previous game played by the first game user on a terminal of a second game user based on the game log stored in association with the first game user, in response to a request from the terminal of the second game user.

An exemplary embodiment also discloses a game service system includes: a game service provider configured to provide a game service to terminals of game users over a network; a game log manager configured to store and manage a game log of a game played through the game service in association with a first game user having played the game; a match intermediary configured to create an artificial intelligence player for processing the same play as a play of a previous game played by the first game user based on the game log in response to a request for a match from a second game user; and a match processor configured to process a match between the artificial intelligence player and the second game user.

An exemplary embodiment also disclose a file distribution system for providing a file for installing an application to a terminal of a user, the file distribution system including a file manager configured to receive the file and information about the application from a file provider, and to register and store the received file and information about the application; an application information provider configured to provide a link for downloading the file and information about the application through a webpage; and a file transmitter configured to transmit the file to the terminal in response to a request from the terminal through the link. The application may include a function of controlling the terminal to proceed with a game according to a game service provided from a game service system; a function of controlling the terminal to verify a game ranking of the user through communication with the game service system; a function of controlling the terminal to request the game service system to replay a previous game played by another game user of a predetermined game ranking or greater; and a function of controlling the terminal to replay a previous game played by the other game user through a replay service provided from the game service system based on a game log of the previous game played by the other game user.

It is to be understood that both the foregoing general description and the following detailed description are exemplary and explanatory and are intended to provide further explanation of the invention as claimed.

According to exemplary embodiments, it is possible to provide a replay service of a game to a second game user based on a game log of a previous game played by a first game user, with respect to the first game user of a predetermined ranking or greater based on rankings of game users.

Also, according to exemplary embodiments, it is possible to intermediate a match between a first game user and a second game user in response to a selection of the second game user using a replay service.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the invention.

DETAILED DESCRIPTION OF THE ILLUSTRATED EMBODIMENTS

Figure 1:
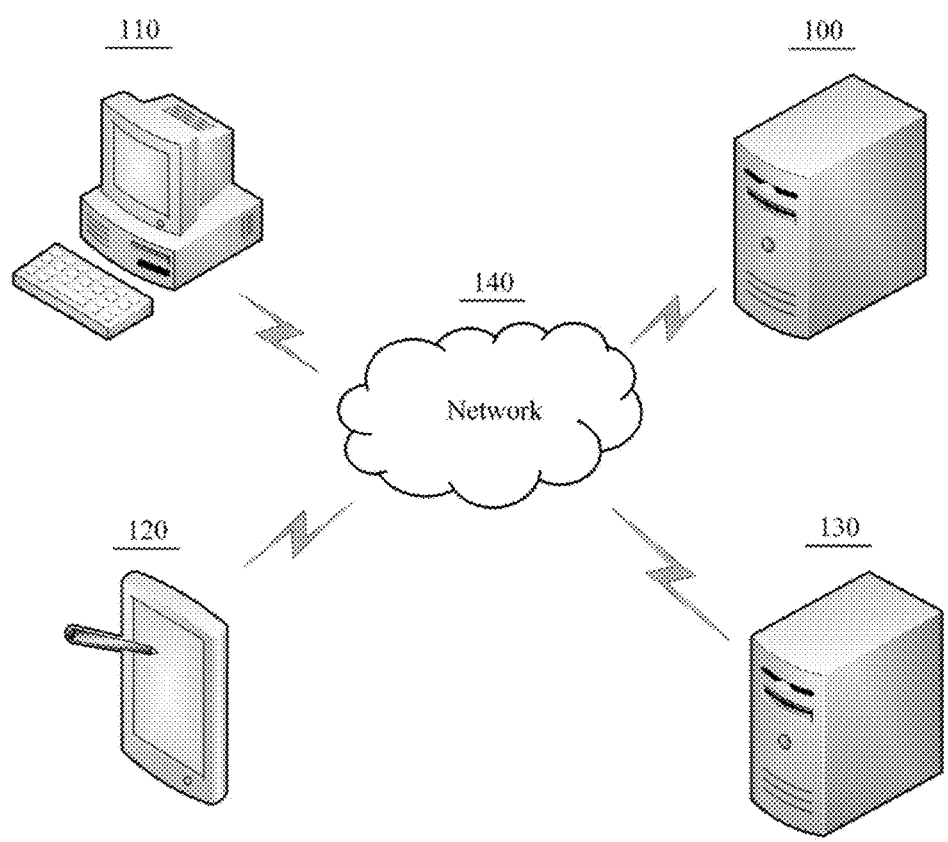
FIG. 1 illustrates an example of an entire system according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 illustrates an example of an entire system according to an exemplary embodiment. FIG. 1 illustrates a game service system 100, a wired user terminal 110, a wireless user terminal 120, a file distribution system 130, and a network 140.

The game service system 100 refers to a server to provide a game service. A game service provided from the game service system 100 may be a wired game service for the wired user terminal 110, a wireless game service for the wireless user terminal 120, or a wired/wireless game service in which the wired game service and the wireless game service are hybridized. For example, a user may use a game service by connecting to the game service system 100 over the network 140 using a user terminal, for example, the wired user terminal 110 or the wireless user terminal 120 suitable for a feature of the game service. The wired user terminal 110 and the wireless user terminal 120 are examples of terminals capable of being used by the user. Any type of terminals for using the game service by connecting to the game service system 100 through wired or wireless communication may be employed. In addition, although FIG. 1 illustrates an example in which the game service system 100 is configured as a single server device, the game service system 100 may be configured using a combination of server devices.

The file distribution system 130 refers to a server to distribute a file for installing an application used to be provided with the game service in a terminal of the user, for example, the wired user terminal 110 or the wireless user terminal 120. For example, the user may download the file for installing the application by connecting to the file distribution system 130 over the network 140 using the wireless user terminal 120, and may install the application in the wireless user terminal 120 using the downloaded file. In addition, the user may use the game service by connecting to the game service system 100 using the installed application. If necessary, the file distribution system 130 may be a system included in the game service system 100, may be a system associated with the game service system 100, or may be a system of a tertiary user.

Figure 2:
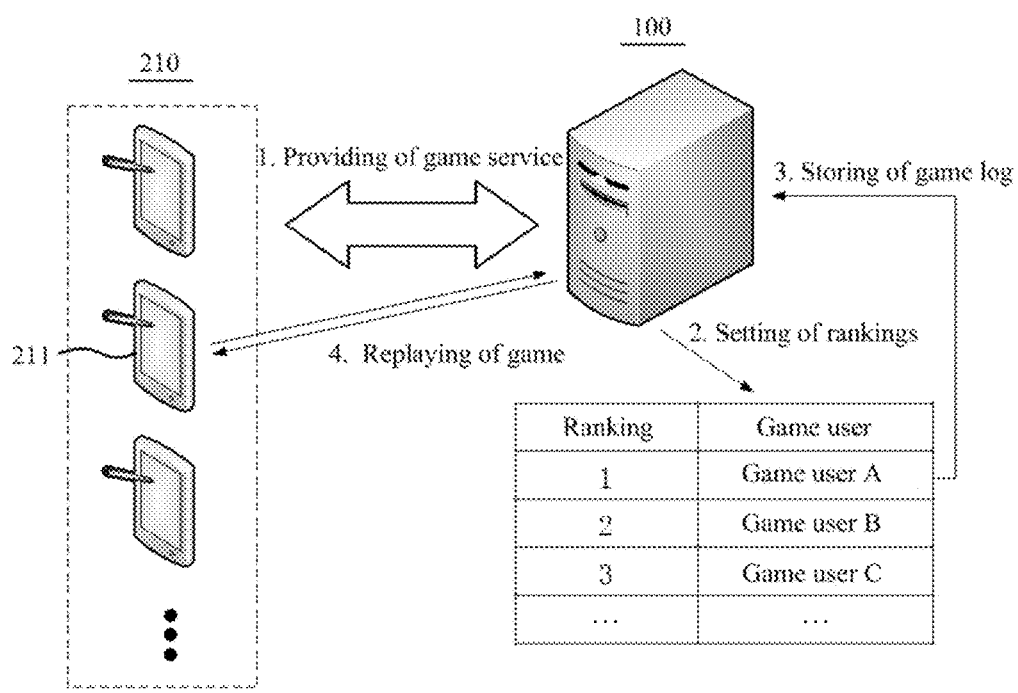
FIG. 2 illustrates an example of a game replay process of a game service system according to an exemplary embodiment.

FIG. 2 illustrates an example of a game replay process of a game service system according to an exemplary embodiment.

1. Providing of Game Service

The game service system 100 may provide a game service to terminals 210 of game users over a network.

2. Setting of Rankings

The game service system 100 may set rankings of the game users based on progress results of the game service.

3. Storing of Game Log

The game service system 100 may store and manage a game log of a previous game played by a first game user, for example, a game user who ranks a first place in FIG. 2, of a predetermined ranking or greater in association with the first game user. Predetermined rankings may be based on absolute terms such as a number of points or levels, or may be based on relative terms, such as top 10% or top 10 high scorers.

4. Replaying of Game

The game service system 100 may provide a replay service to replay the previous game played by the first game user on a terminal 211 of a second game user based on the game log stored in association with the first game user, in response to a request from the terminal 211 of the second game user.

For example, in the case of a game that allows a match between game users, the game service system 100 may determine rankings of game users based on the number of wins or points according to the number of wins. In the case of a game that proceeds with a game mission, the game service system 100 may determine rankings of game users based on a progress level of the game mission or points according to the progress of the game mission. Such rankings may be set for the all users, and may be set for subsets of game users, for example, friends, having set a mutual relationship.

The first game user of the predetermined ranking or greater may be a single game user or a plurality of game users based on the predetermined ranking. If necessary, the game log may be created, stored, and managed with respect to all of the game users. The game service system 100 may replay the previous game played by the first game user for the second game user that is to view a game play of the first game user using the game log. For example, when the game service provided from the game service system 100 is classified into a defense genre of a game, the game service system 100 may store, as a game log, information about types of characters appearing on the game and points in times at which the characters appear based on a control of a game user or settings of the game user, and may make the same type of a character appear on the game at the same point in time based on the game log when replaying the game. Through this, the game service system 100 may provide information about the game play of the first game user to the second game user.

Figure 3:
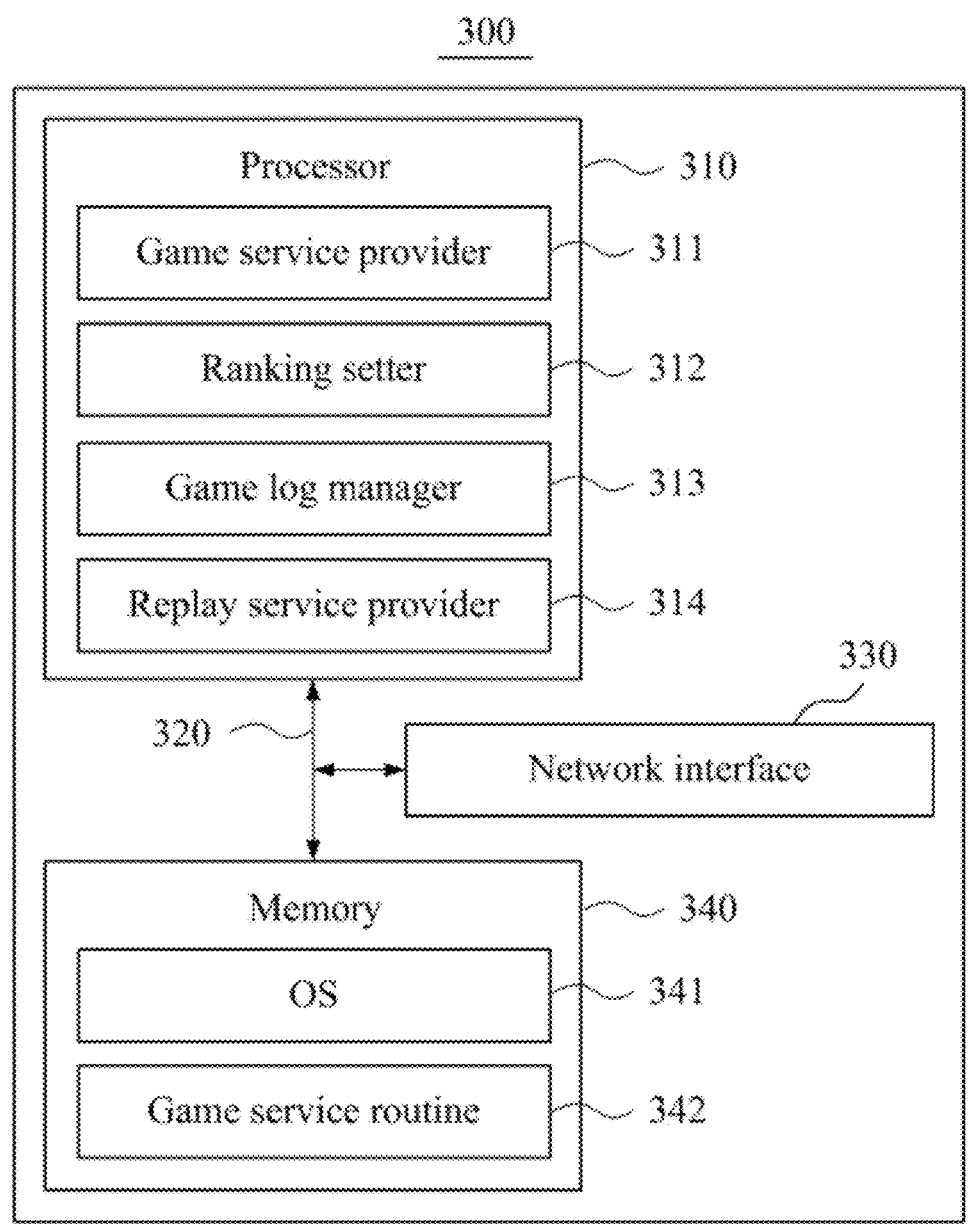
FIG. 3 is a block diagram illustrating a configuration of a game service system according to an exemplary embodiment.
Figure 4:
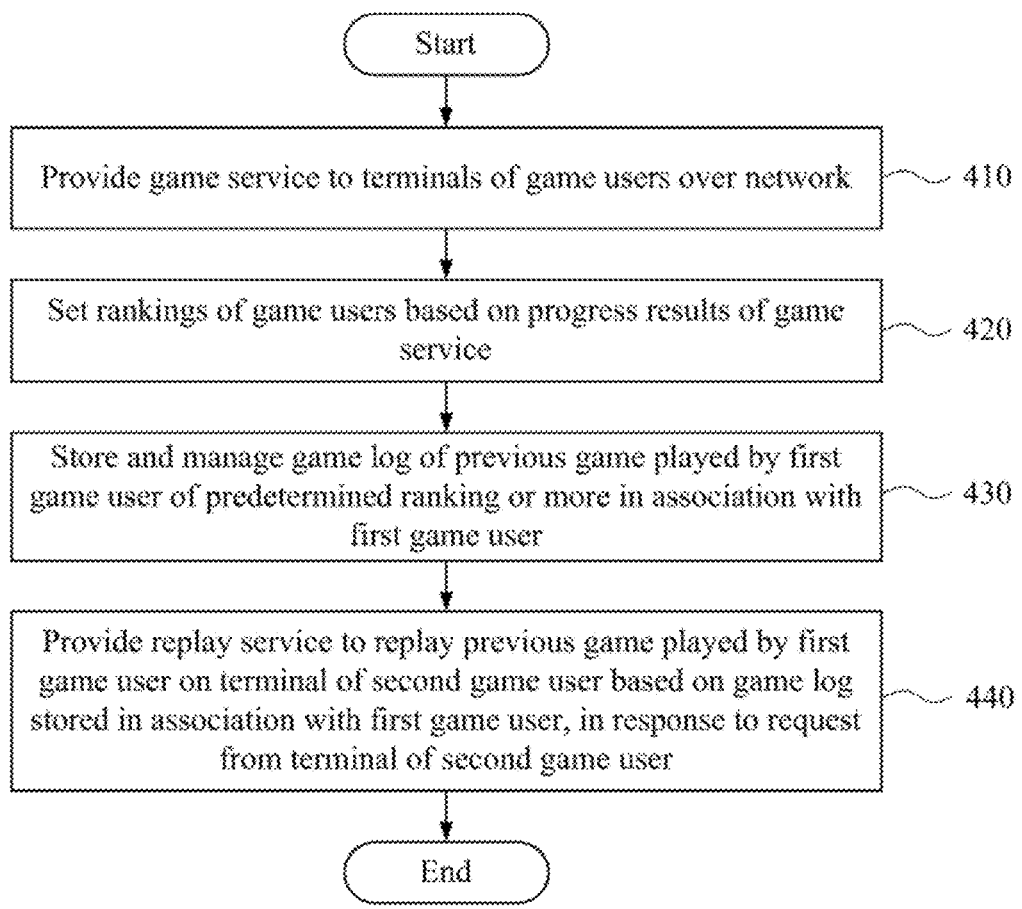
FIG. 4 is a flowchart illustrating a game service method according to an exemplary embodiment.

FIG. 3 is a block diagram illustrating a configuration of a game service system according to an exemplary embodiment, and FIG. 4 is a flowchart illustrating a game service method according to an exemplary embodiment.

The game service system 300 of FIG. 3 may correspond to the game service system 100 described above with reference to FIGS. 1 and 2. Referring to FIG. 3, the game service system 300 may include a processor 310, a bus 320, a network interface 330, and a memory 340. The memory 340 may include an operating system (OS) 341 and a game service routine 342. The processor 310 may include a game service provider 311, a ranking setter 312, a game log manager 313, and a replay service provider 314. According to other example embodiments, the game service system 300 may include more constituent elements than the number of constituent elements of FIG. 3. In general, constituent elements according to the related art are not required to be clearly illustrated. For example, the game service system 300 may include other constituent elements such as a display or a transceiver.

The memory 340, as non-transitory computer readable media, may include a permanent mass storage device such as random access memory (RAM), read only memory (ROM), and a disk drive. Also, a program code for the OS 341 and the game service routine 342 may be stored in the memory 340. The software constituent elements may be loaded from non-transitory computer-readable media separate from the memory 340 using a drive mechanism (not shown). The non-transitory computer-readable media may include computer-readable media such as a floppy disk, a tape, a DVD/CD-ROM drive, and a memory card. According to other example embodiments, the software constituent elements may be loaded to the memory 340 through the network interface 330, instead of using the non-transitory computer readable media. For example, the game service routine 342 may be loaded to the memory 340 based on a program installed by files provided from developers over a network.

The bus 320 may enable communication and data transmission between the constituent elements of the game service system 300. The bus 320 may be configured using a high-speed serial bus, a parallel bus, a storage area network (SAN), and/or other appropriate communication technologies.

The network interface 330 may be a computer hardware constituent element to connect the game service system 300 to a computer network. The network interface 330 may connect the game service system 300 to the computer network through a wireless or wired connection.

The processor 310 may be configured to process an instruction of a computer program by performing a basic arithmetic and logic operation, and an input/output (I/O) operation of the game service system 300. The instruction may be provided from the memory 340 or the network interface 330 to the processor 310 through the bus 320. The processor 310 may be configured to execute program code for the game service provider 311, the ranking setter 312, the game log manager 313, and the replay service provider 314. The program code may be stored (e.g., the game service routine 342) in a storage device such as the memory 340.

The game service provider 311, the ranking setter 312, the game log manager 313, and the replay service provider 314 may be configured to perform operations 410 through 440 of FIG. 4.

In operation 410, the game service provider 311 may provide a game service to terminals of game users over a network.

In operation 420, the ranking setter 312 may set rankings of the game users based on progress results of the game service.

In operation 430, the game log manager 313 may store and manage a game log of a previous game played by a first game user of a predetermined ranking or greater in association with the first game user. For example, the previous game played by the first game user may include a predetermined number of games most recently played by the first game user or a predetermined number of games most recently won by the first game user. If "3" is preset, the game log manager 313 may store and manage game logs of three games most recently played by the first game user or three games most recently won by the first game user.

In operation 440, the replay service provider 314 may provide a replay service to replay the previous game played by the first game user on a terminal of a second game user based on the game log stored in association with the first game user, in response to a request from the terminal of the second game user. For example, the replay service provider 314 may provide the replay service to replay, on the terminal of the second game user, a game selected at the terminal of the second game user or a game selected using a game log of a game randomly selected from among game logs stored in association with the first game user.

In operation 440, the replay service provider 314 may transmit the game log of the previous game played by the first game user to the terminal of the second game user. Here, the selected game may be replayed based on the transmitted game log on the terminal of the second game user.

In operation 440, the replay service provider 314 may create a replay video of the selected game based on the game log of the previous game played by the first game user, and may transmit the created replay video to the terminal of the second game user.

Figure 5:
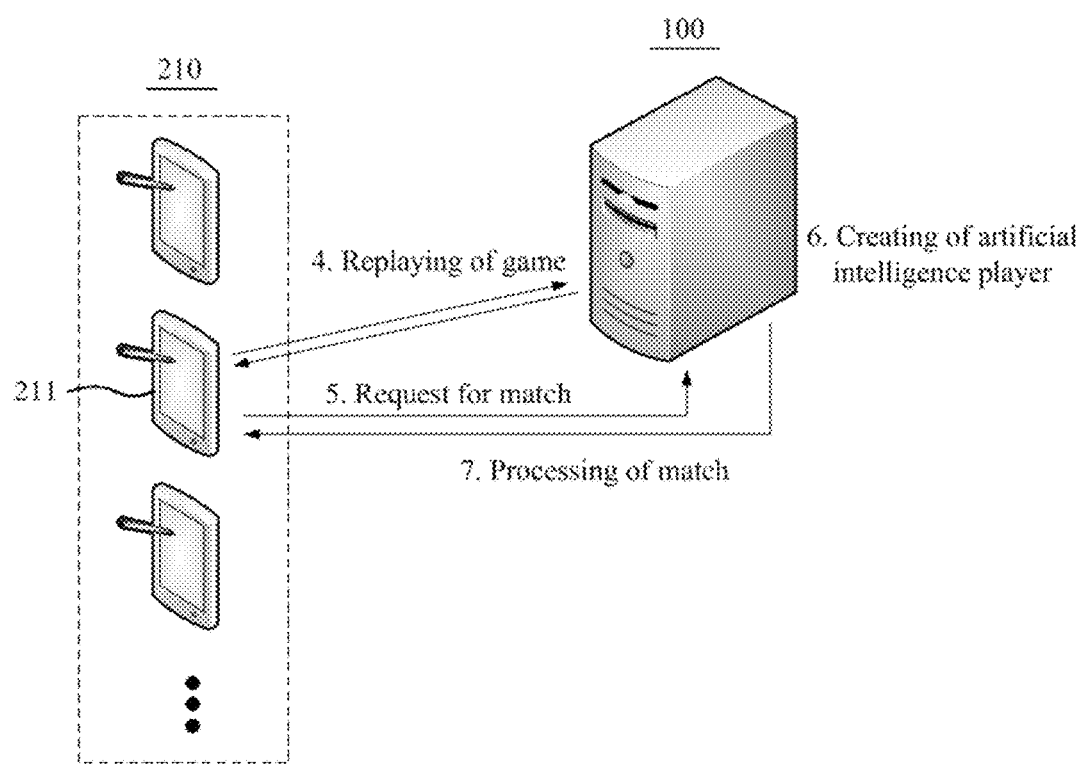
FIG. 5 illustrates an example of a process of intermediating a match between game users according to an exemplary embodiment.

FIG. 5 illustrates an example of a process of intermediating a match between game users according to an exemplary embodiment. FIG. 5 illustrates a process of intermediating a match between game users after the process of "4. Replaying of game" of FIG. 2.

5. Request for Match

The game service system 100 may receive a request for a match associated with the replay service from the terminal 211 of the second game user.

6. Creating of Artificial Intelligence Player

The game service system 100 may create an artificial intelligence player for processing the same play as a play of the previous game played by the first game user based on the game log.

7. Processing of Match

The game service system 100 may process a match between the artificial intelligence player and the second game user. For example, the created artificial intelligence player may allow the same types of characters to sequentially appear at the same points in times on a matching game with the second game user, based on a game log including information such as types of characters appearing based on an instruction input from the first game user into the previous game played by the first game user or game settings of the first game user in the previous game, and points in time at which the corresponding characters appear. In perspective from the second game user, the characters appear as characters of a counter party on the matching game and the second game user may play the match through a fight with the characters of the counter party.

Although not illustrated, the game service method of FIG. 4 regarding the match between the game users may further include an operation of intermediating a match between the first game user and the second game user in response to a request for the match associated with the replay service from the terminal of the second game user, in addition to operations 410 through 440. The non-illustrated operation may be performed by a match intermediary (not shown) that may be further included in the processor 310 of the game service system 300. The match intermediary may intermediate the match between the first game user and the second game user by creating an artificial intelligence player for processing the same play as a play of the previous game played by the first game user based on the game log and by processing a match between the artificial intelligence player and the second game user. The above intermediating of the match may be performed in perspective from the second game user requesting the match using the artificial intelligence player for replaying a play of the first game user, actually, irrespective of the first game user.

Figure 6:
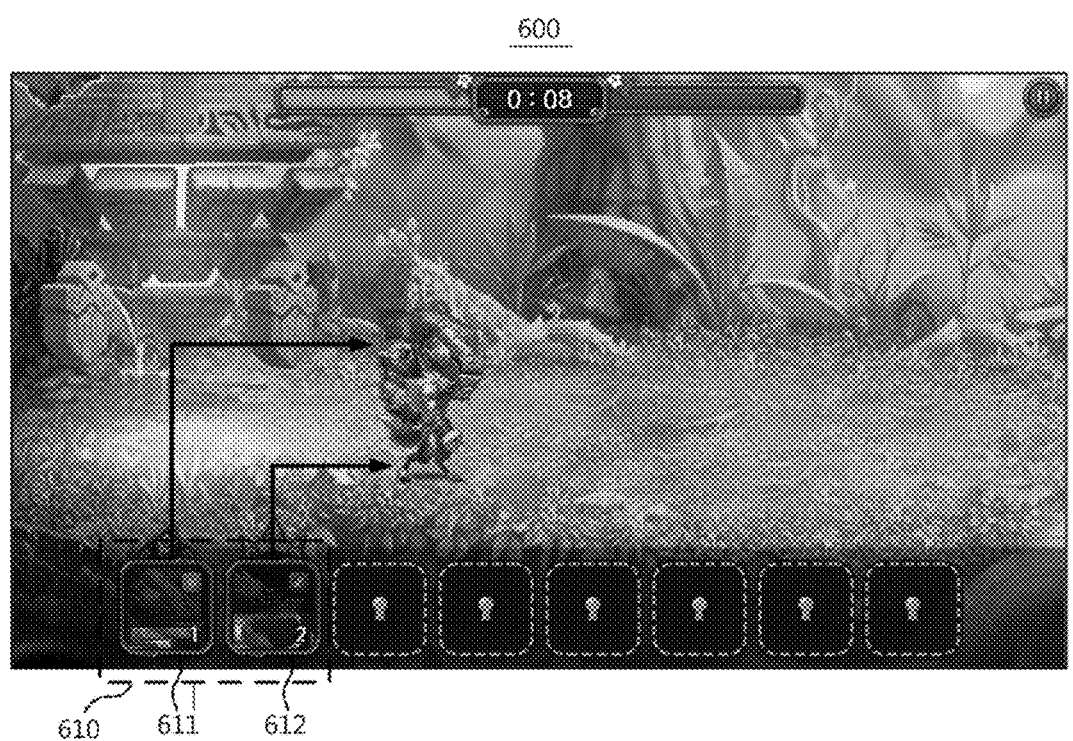
FIG. 6 illustrates an example of a game service of a defense genre of a game according to an exemplary embodiment.

FIG. 6 illustrates an example of a game service of a defense genre of a game according to an exemplary embodiment. A screen 600 shows an example of a terminal screen of a game user on which a game of a defense genre is being executed. A box 610 indicated with dotted lines indicates a user interface (button) for instructing sorties of characters. In response to a touch of a game user on a button associated with a predetermined character based on the assumption that a terminal of the game user includes a touch screen, the character may appear on the game. Here, in the game according to an exemplary embodiment, the number of available sorties may be set for each character. For example, the number of available sorties "1" is indicated on a button A 611 and the number of available sorties "2" is indicated on a button B 612. The number of available sorties may express the number of times that a corresponding character is allowed to iteratively appear on the game.

Further, the game according to an exemplary embodiment may provide an automatic sortie function. For example, when a character set for the button B 612 appears on the game in response to a click of the user on the button B 612, the number of available sorties reduces from "2" to "1". In this example, although the number of available sorties remains, the character set for the button B 612 is disallowed from making a sortie during a character-by-character reuse standby time. The character is allowed to make a sortie in response to a sortie instruction of the game user when the reuse standby time is over. The automatic sortie function may be a function for allowing a character to automatically make a sortie, for example, appear on a game without the sortie instruction of the game user when the reuse standby time is over within the number of available sorties. The automatic sortie function may be set for each character and may be applied to a character of which the automatic sortie function is activated.

As described above, according to example embodiments, the game service may service a defense genre of a game in which a character appears on the game based on the number of available sorties set for each character with respect to at least one character owned by the game user, and fights with at least one character of a counter party. In addition, in this game, in the case of a character of which a character-by-character reuse standby time is over, the character may appear on the game in response to a sortie instruction of the game user, and in the case of a character of which an automatic sortie is activated using an automatic sortie function, the character may appear on the game in response to the character-by-character reuse standby time being over, irrespective of the sortie instruction of the game user.

Figure 7:
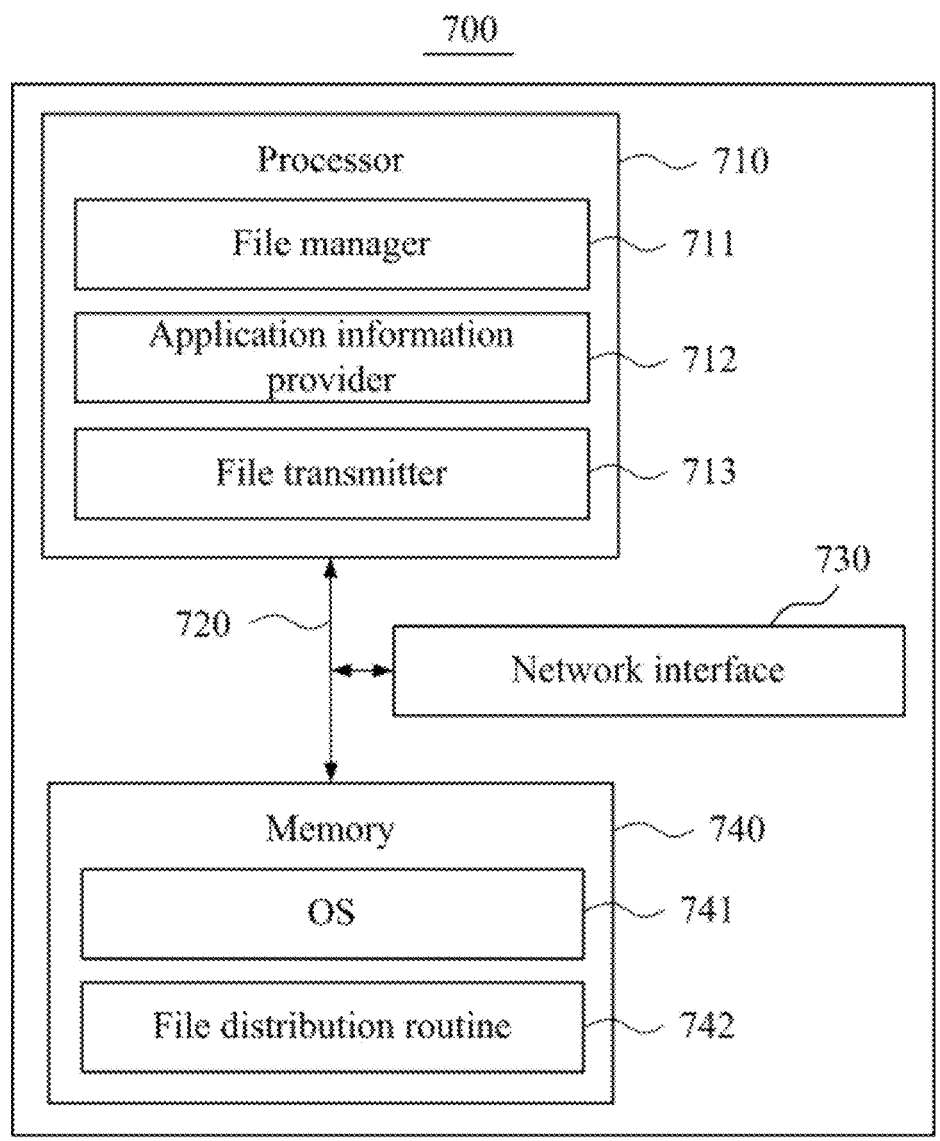
FIG. 7 is a block diagram illustrating a configuration of a file distribution system according to an exemplary embodiment.
Figure 8:
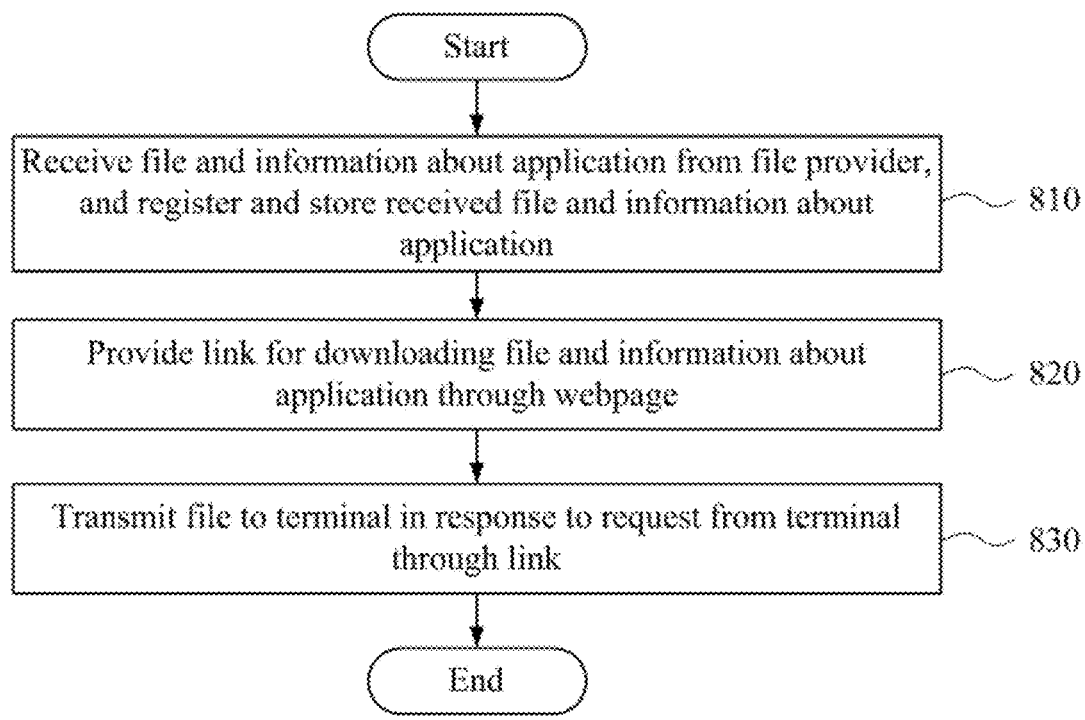
FIG. 8 is a flowchart illustrating a file distribution method according to an exemplary embodiment.

FIG. 7 is a block diagram illustrating a configuration of a file distribution system according to example embodiments, and FIG. 8 is a flowchart illustrating a file distribution method according to example embodiments.

The file distribution system 700 of FIG. 7 may correspond to the file distribution system 130 of FIG. 1. Referring to FIG. 7, the file distributions system 700 may include a processor 710, a bus 720, a network interface 730, and a memory 740. The memory 740 may include an OS 741 and a file distribution routine 742. The processor 710 may include a file manager 711, an application information provider 712, and a file transmitter 713. According to other example embodiments, the file distribution system 700 may include more constituent elements than the number of constituent elements of FIG. 7. In general, constituent elements according to the related art are not required to be clearly illustrated. For example, the file distribution system 700 may include other constituent elements such as a display or a transceiver.

The processor 710, the bus 720, the network interface 730, and the memory 740 of FIG. 7 may operate in a similar manner as the processor 310, the bus 320, the network interface 330, and the memory 340 of FIG. 3. The file manager 711, the application information provider 712, and the file transmitter 713 included in the processor 710 may be configured to perform operations 810 through 830 of FIG. 8 based on the file distribution routine 742 of the memory 740.

In operation 810, the file manager 711 may receive a file and information about an application from a file provider, and may register and store the received file and information about the application.

In operation 820, the application information provider 712 may provide a link for downloading the file and information about the application through a webpage. For example, information about the application may be displayed through a variety of paths such as predetermined application for introducing applications and a webpage, and a file download page may include a link for downloading the file.

In operation 830, the file transmitter 713 may transmit the file to the terminal in response to a request from the terminal through the link. For example, when a terminal requests a file through the download page, the file transmitter 713 may transmit the requested file to the terminal.

Here, the application may include (1) a function of controlling the terminal to proceed with a game according to a game service provided from a game service system, (2) a function of controlling the terminal to verify a game ranking of a user through communication with the game service system, (3) a function of controlling the terminal to request the game service system to replay a previous game played by another game user of a predetermined game ranking or greater, and (4) a function of controlling the terminal to replay a previous game played by the other game user through a replay service provided from the game service system based on a game log of the previous game played by the other game user.

Also, if necessary, the application may selectively further include (5) a function of controlling the terminal to request the game service system for a match with the other game user in association with the replay service. The function may include a function for fighting with an artificial intelligence player for processing the same player as a play of the previous game played by the other game user based on the game log.

Figure 9:
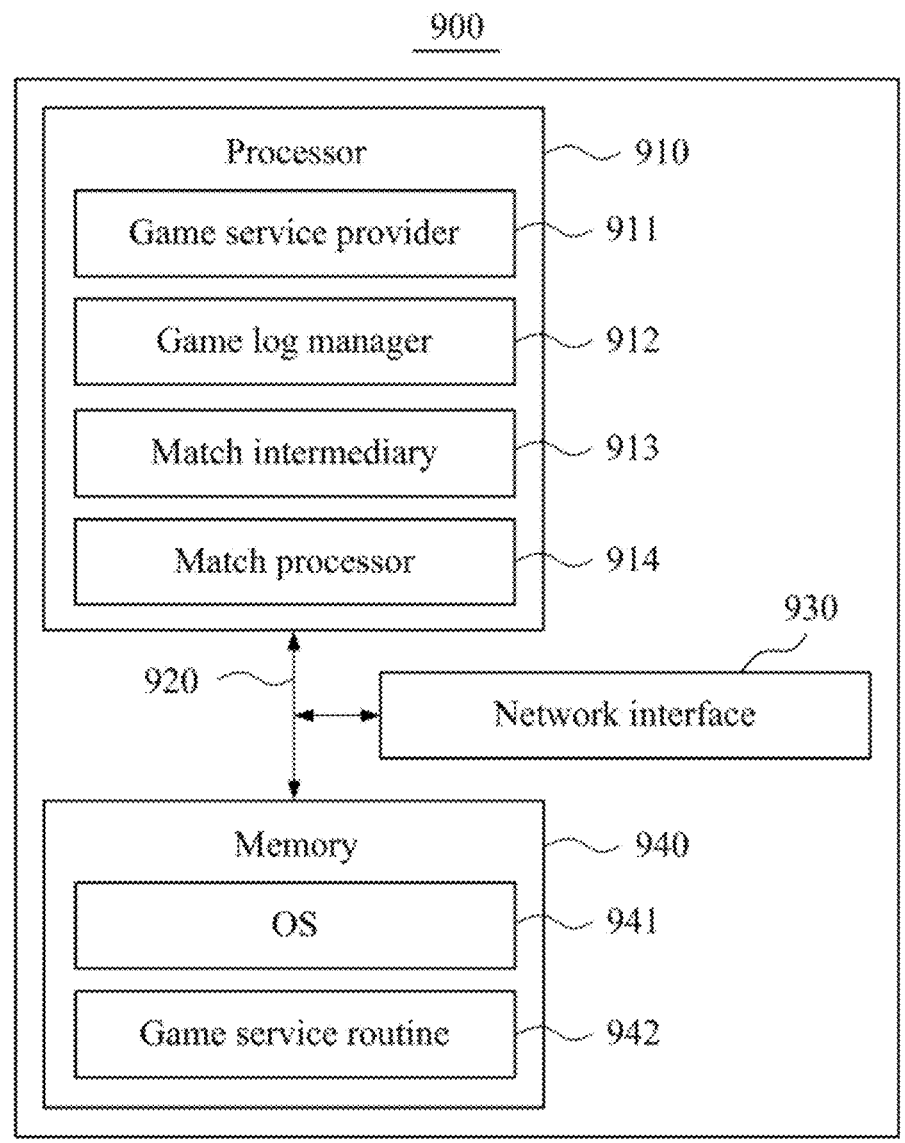
FIG. 9 is a block diagram illustrating a configuration of a game service system according to an exemplary embodiment.
Figure 10:
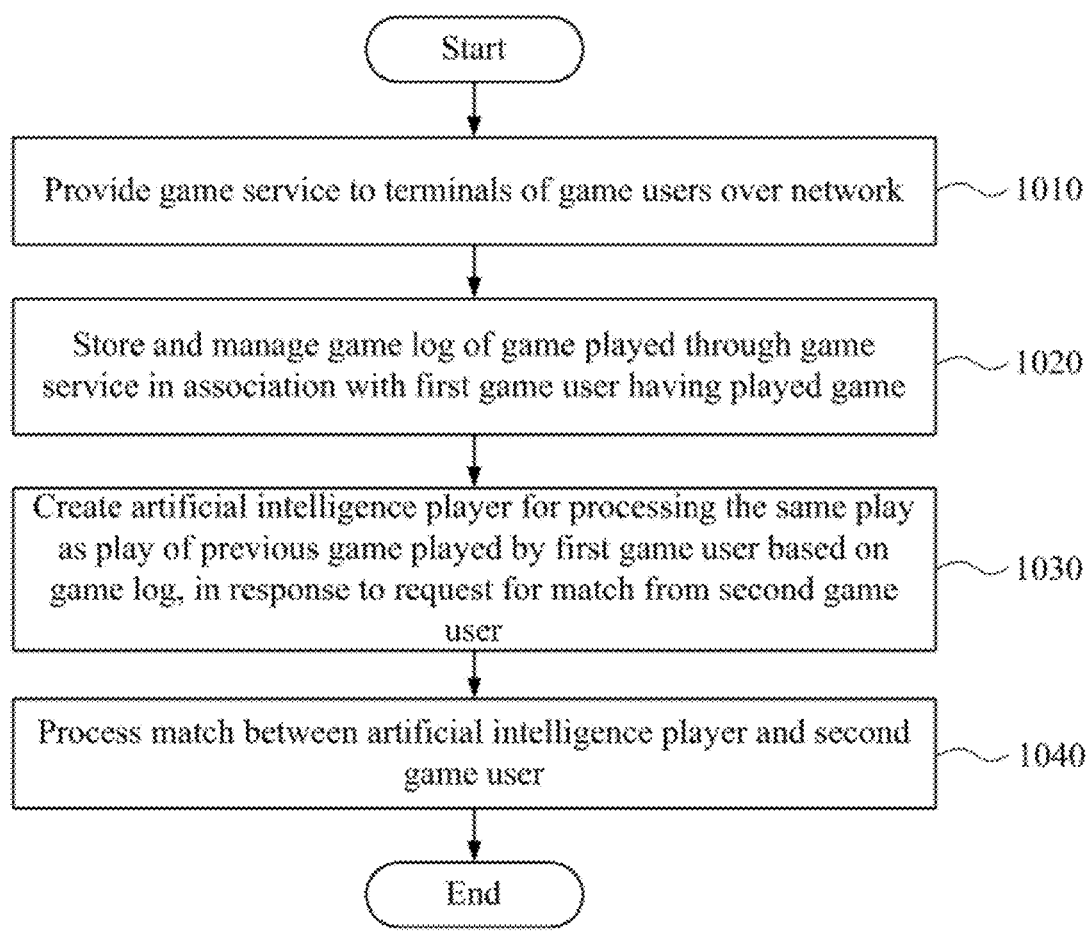
FIG. 10 is a flowchart illustrating a game service method according to an exemplary embodiment.

FIG. 9 is a block diagram illustrating a configuration of a game service system according to example embodiments, and FIG. 10 is a flowchart illustrating a game service method according to example embodiments.

Referring to FIG. 9, the game service system 900 may include a processor 910, a bus 920, a network interface 930, and a memory 940. The memory 940 may include an OS 941 and a game service routine 942. The processor 910 may include a game service provider 911, a game log manager 912, a match intermediary 913, and a match processor 914. According to other example embodiments, the game service system 900 may include more constituent elements than the number of constituent elements of FIG. 9. In general, constituent elements according to the related art are not required to be clearly illustrated. For example, the game service system 900 may include other constituent elements such as a display or a transceiver.

The processor 910, the bus 920, the network interface 930, and the memory 940 of FIG. 9 may operate in a similar manner as the processor 310, the bus 320, the network interface 330, and the memory 340 of FIG. 3. The game service provider 911, the game log manager 912, the match intermediary 913, and the match processor 914 included in the processor 910 may be configured to perform operations 1010 through 1040 of FIG. 10 based on the game service routine 942 of the memory 940.

In operation 1010, the game service provider 911 may provide a game service to terminals of game users over a network.

In operation 1020, the game log manager 912 may store and manage a game log of a game played through the game service in association with a first game user having played the game. For example, with respect to all of the game users, a game log of a game played by each of the game users may be stored in association with the corresponding game user. As another example, with respect to a predetermined game user such as a game user of a predetermined ranking or greater, a game log of a game played by the predetermined game user may be stored in association with the predetermined game user. As another example, game logs of a subset game users having participated in a predetermined event or game logs of game users requesting the game logs to be separately stored may be stored and managed in association with the corresponding game users, respectively.

In operation 1030, the match intermediary 913 may create an artificial intelligence player for processing the same play as a play of a previous game played by the first game user based on the game log, in response to a request for a match from a second game user. The second game user may correspond to a game user among the entire game users and may correspond to a predetermined game user if necessary. For example, a game provided through the game service may be configured so that all of the game users may play a match with other game users without any specific condition. As another example, a game provided through the game service may be configured so that a game user of a predetermined condition, for example, a game user using the replay service may play a match with a game user of another condition, for example, a game user having played a game replayed through a replay service.

In operation 1040, the match processor 914 may process a match between the artificial intelligence player and the second game user. For example, as described above, the game log may include information about types of characters appearing on a game and points in times at which the characters appear based on a control of a game user or settings of the game user. In this example, the artificial intelligence player may allow the same type of a character to appear on the game at the same point in time based on the game log when replaying the game, thereby providing a match service as if the second game user feels like playing a match with the first game user.

In addition, although not illustrated, the game service method according to the example embodiments may further include an operation of setting rankings of game users based on progress results of the game service, in addition to operations 1010 through 1040. The non-illustrated operation may be performed by a ranking setter (not shown) that may be further included in the processor 910. The first game user may include a game user of a predetermined ranking or greater.

The previous game played by the first game user may include a predetermined number of games most recently played by the first game user or a predetermined number of games most recently won by the first game user.

Further, in addition to operations 1010 through 1040, the game service method according to the example embodiments may further include an operation of providing a replay service to replay the previous game played by the first game user on a terminal of the second game user based on the game log. The non-illustrated operation may be performed by a replay service provider (not shown) that may be further included in the processor 910. Here, the request for the match from the second game user may occur in association with the replay service. For example, the second game user may refer to a previous play of the first game user through the replay service and then may request the first game user for the match using a match request function provided through the replay service. In this case, as described above, the artificial intelligence player copying a play of the first game user may play a match with the second game user.

To provide the replay service, the replay service provider may transmit the game log of the previous game played by the first game user to the terminal of the second game user. In this case, the previous game played by the first game user may be replayed based on the game log on the terminal of the second game user. Further, to provide the replay service, the replay service provider may create a replay video of the previous game played by the first game user based on the game log, and may transmit the created replay video to the terminal of the second game user According to example embodiments, it is possible to provide a replay service of a game to a second game user based on a game log of a previous game played by a first game user, with respect to the first game user of a predetermined ranking or greater based on rankings of game users. Also, it is possible to intermediate a match between the first game user and the second game user in response to a selection of the second game user using the replay service.

The example embodiments may be recorded in non-transitory computer-readable media including program instructions to implement various operations embodied by a computer. The media may also include, alone or in combination with the program instructions, data files, data structures, and the like. The media and program instructions may be specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A game service method comprising:
   providing a game service to terminals of game users over a network;
   setting rankings of the game users based on progress results of the game service;
   storing a game log of a previous game played by a first game user of a predetermined ranking or greater in association with the first game user;
   receiving a request for a replay service from a terminal of a second game user;
   providing the replay service to replay the previous game played by the first game user on the terminal of the second game user based on the game log stored in association with the first game user, in response to the request from the terminal of the second game user; and
   setting, for each of a plurality of characters owned by the second game user, a number of available sorties, the plurality of characters including a first character,
   wherein the game service is configured to provide a game within a defense genre in which the first character appears in the game based on the number of available sorties set for the first character and fights with at least one character of a counter party, and
   wherein, in the game, in a case of a character type of which a character-by-character reuse standby time is over, the first character appears on the game in response to a sortie instruction of the second game user, and in a case of a character type of which an automatic sortie is activated using an automatic sortie function, the first character appears on the game in response to the character-by-character reuse standby time being over, irrespective of the sortie instruction of the second game user.

2. The game service method of claim 1, wherein the previous game played by the first game user is selected from the group consisting of a predetermined number of games most recently played by the first game user and a predetermined number of games most recently won by the first game user, and the providing of the replay service comprises providing the replay service to replay a game selected at the terminal of the second game user or a game randomly selected from among the predetermined number of games most recently played by the first game user and the predetermined number of games most recently won by the first game user.

3. The game service method of claim 2, wherein the providing of the replay service comprises transmitting the game log of the previous game played by the first game user to the terminal of the second game user, and
   the selected game is replayed on the terminal of the second game user based on the game log.

4. The game service method of claim 2, wherein the providing of the replay service comprises creating a replay video of the selected game based on the game log of the previous game played by the first game user, and transmitting the created replay video to the terminal of the second game user.

5. The game service method of claim 1, further comprising:
   receiving a request for a match associated with the replay service from the terminal of the second game user; and
   intermediating the match between the first game user and the second game user in response to the request for the match associated with the replay service from the terminal of the second game user.

6. The game service method of claim 5, wherein the intermediating comprises creating an artificial intelligence player for processing a same play as a play of the previous game played by the first game user based on the game log, and processing the match between the artificial intelligence player and the second game user.

7. A game service method comprising:
   providing a game service to terminals of game users over a network;
   storing a game log of a game played through the game service in association with a first game user having played the game;
   receiving a request for a match from a second game user;
   creating an artificial intelligence player for processing a same play as a play of a previous game played by the first game user based on the game log, in response to the request for the match from the second game user;
   processing the match between the artificial intelligence player and the second game user; and
   setting, for each of a plurality of characters owned by the second game user, a number of available sorties, the plurality of characters including a first character,
   wherein the game service provides a game within a defense genre in which the first character appears in the game based on the number of available sorties set for the first character and fights with at least one character of a counter party, and
   wherein, in the game, in a case of a character type of which a character-by-character reuse standby time is over, the first character appears on the game in response to a sortie instruction of the second game user, and in a case of a character type of which an automatic sortie is activated using an automatic sortie function, the character appears on the game in response to the character-by-character reuse standby time being over, irrespective of the sortie instruction of the second game user.

8. The game service method of claim 7, further comprising:

setting rankings of the game users based on progress results of the game service, wherein the first game user comprises a game user of a predetermined ranking or greater.

9. The game service method of claim 8, wherein the previous game played by the first game user is selected from the group consisting of a predetermined number of games most recently played by the first game user and a predetermined number of games most recently won by the first game user.

10. The game service method of claim 7, further comprising:

providing a replay service to replay the previous game played by the first game user on a terminal of the second game user based on the game log.

11. The game service method of claim 10, wherein the request for the match from the second game user occurs in association with the replay service.

12. The game service method of claim 10, wherein the providing of the replay service comprises transmitting the game log of the previous game played by the first game user to the terminal of the second game user, and the previous game played by the first game user is replayed based on the game log on the terminal of the second game user.

13. The game service method of claim 10, wherein the providing of the replay service comprises creating a replay video of the previous game played by the first game user based on the game log, and transmitting the created replay video to the terminal of the second game user.

14. A non-transitory computer-readable medium having stored thereon processor-executable instructions configured to cause a processor to perform operations to implement the method of claim 1.

15. A game service system comprising:

a game service provider configured to provide a game service to terminals of game users over a network;

a ranking setter configured to set rankings of the game users based on progress results of the game service;

a game log manager configured to store a game log of a previous game played by a first game user of a predetermined ranking or greater in association with the first game user; and a replay service provider configured to provide a replay service to replay the previous game played by the first game user on a terminal of a second game user based on the game log stored in association with the first game user, in response to a request from the terminal of the second game user, wherein the game service provider is configured to set, for each of a plurality of characters owned by the second game user, a number of available sorties, the plurality of characters including a first character, wherein the game service provider is configured to provide a game within a defense genre in which the first character appears in the game based on the number of available sorties set for the first character and fights with at least one character of a counter party, and wherein, in the game, in a case of a character type of which a character-by-character reuse standby time is over, the first character appears on the game in response to a sortie instruction of the second game user, and in a case of a character type of which an automatic sortie is activated using an automatic sortie function, the first character appears on the game in response to the character-by-character reuse standby time being over, irrespective of the sortie instruction of the second game user.

16. The game service system of claim 15, wherein the previous game played by the first game user is selected from the group consisting of a predetermined number of games most recently played by the first game user and a predetermined number of games most recently won by the first game user, and the replay service provider is configured to provide the replay service to replay a game selected from the group consisting of games selected at the terminal of the second game user and games randomly selected from among the predetermined number of games most recently played by the first game user and the predetermined number of games most recently won by the first game user.

17. The game service system of claim 16, wherein the replay service provider is configured to transmit the game log of the previous game played by the first game user to the terminal of the second game user, and the selected game is replayed based on the game log on the terminal of the second game user.

18. The game service system of claim 16, wherein the replay service provider is configured to create a replay video of the selected game based on the game log of the previous game played by the first game user, and to transmit the created replay video to the terminal of the second game user.

* * * * *